United States Patent [19]

Holley

[11] Patent Number: 5,033,953
[45] Date of Patent: Jul. 23, 1991

[54] PELLETIZING DISC ASSEMBLY AND CONTROL SYSTEM

[76] Inventor: Carl A. Holley, 14315 Tall Oaks, Riverview, Mich. 48192

[21] Appl. No.: 515,075

[22] Filed: Apr. 26, 1990

[51] Int. Cl.$^5$ .................. B29B 9/08; B29C 67/02
[52] U.S. Cl. .................. 425/140; 264/40.1; 264/117; 425/145; 425/222; 425/232
[58] Field of Search .............. 425/222, 332, 333, 435, 425/DIG. 20, DIG. 50, DIG. 101, 135, 140, 145; 264/8, 310, 40.1, 117

[56] References Cited

U.S. PATENT DOCUMENTS

| Re. 31,574 | 5/1984 | Seng | 425/222 |
|---|---|---|---|
| 3,406,426 | 10/1968 | Pobst, Jr. et al. | 425/222 |
| 3,834,850 | 9/1974 | Takewell et al. | 425/222 |
| 3,883,281 | 5/1975 | Holley | 425/222 |
| 4,010,001 | 3/1977 | Dollinger | 425/222 |
| 4,050,271 | 9/1977 | Kleeberg et al. | 425/222 |
| 4,091,060 | 5/1978 | Carter et al. | 425/222 |
| 4,330,246 | 5/1982 | Varrasso | 425/222 |
| 4,344,747 | 8/1982 | Henry | 425/222 |
| 4,698,190 | 10/1982 | Shibata et al. | 425/222 |
| 4,902,210 | 2/1990 | Shibata | 425/222 |

Primary Examiner—Jay H. Woo
Assistant Examiner—Khanh P. Nguyen
Attorney, Agent, or Firm—William J. Ruano

[57] ABSTRACT

In apparatus for spraying water on granular material in a rotating cylindrical pan and for compressing the mixture into pellets. A moisture sensor on said pan provide a signal to a programmable computer controller for providing a constant moisture content on the surface of the pellets. In one embodiment, a liquid nozzle is controlled by a control valve such as to maintain the constant moisture content. In another embodiment, a high intensity mixture is provided for mixing dry powder in varying amount with high moisture material to produce pellets having substantially constant surface moisture when discharged from the pelletizing disc.

1 Claim, 2 Drawing Sheets

PELLETIZING DISC ASSEMBLY AND CONTROL SYSTEM

This invention relates to an improvement of the central system disclosed in my U.S. Pat. No. 3,883,281.

BACKGROUND OF THE INVENTION

The abovementioned patent provides for the flow control of liquids sprayed onto a pelletizing disc by maintaining a constant resistance between two rotated probes inserted into the rolling pellets.

SUMMARY OF THE INVENTION

I have found shortcomings in measuring resistance in a wheatstone bridge and that surface moisture of the rolling pellets may be better measured with an indirect moisture sensor such as one utilizing infrared reflectance, infrared absorption, RF absorption or magnetic resonance. This unit is placed above the rolling pellets which are ready to exit the pelletizing disc. By maintaining a constant surface moisture on these pellets, uniformly sized pellets can be maintained with a maximum density. I have found, unexpectedly, that a programmable controller (computer) provides a far more reliable signal than is generated from a wheatstone bridge.

DESCRIPTION OF THE PREFERRED EMBODIMENTS

The phenomena which makes this control possible is the classifying action of the pelletizing disc whereby the finished pellets raise to the top of the rolling material and form an "eye" of finished pellets just before they are discharged. The discovery which I made is that the amount of surface moisture on the finished pellets is the primary control of both pellet size and density making it possible to adjust the moisture and thereby maintain pellet quality.

The surface moisture is best measured with an infrared unit consisting of an infra-red emitter and a collector to sense the amount of rays reflected from the finished rolling pellets on the pelletizing disc. The amount of reflected rays is an indication of the average amount of surface moisture on the rolling finished pellets. The amount of surface moisture is an indication of the size of the pellets and relates to the density of the pellets.

The amount of reflected rays is analyzed by the programmable controller (computer) in comparison to a desired moisture as represented by a set point programmed into the controller. The programmable controller (computer) is a microprocessor-based, single-loop process controller capable of measuring differences in the amount of reflected infra-red rays and adjusting the control functions to maintain the desired set point. The microprocessor compares the reading from the infra-red collector with the set point to determine the amount of deviation and thereby sets the rate of change which will be made to the control function.

An alternate location for reading the surface moisture of the finished pellets is in the discharge chute from the pelletizing disc or on the product conveyor; however, these locations are not as satisfactory as the location on the pelletizing disc.

Figure 1:
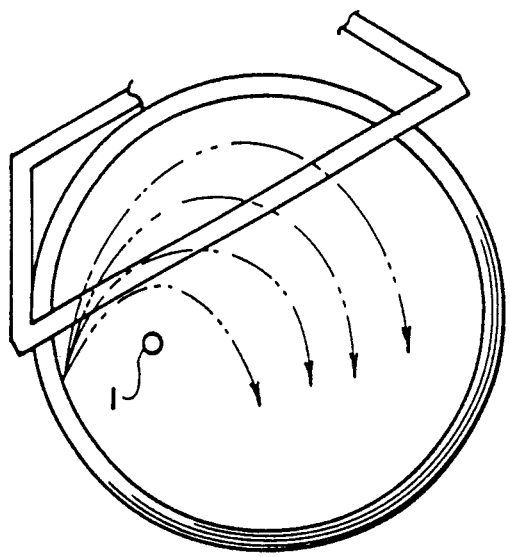
FIG. 1 shows a plan view of the tilted pan rotated in the manner shown in my pelletizing U.S. Pat. No. 3,883,281.
Figure 1A:
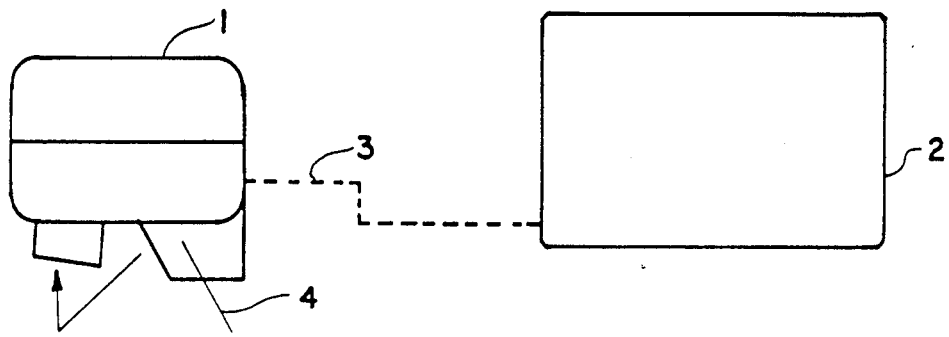
FIG 1a shows an infra-red detector.

Referring to FIG. 1 and FIG. 1a numeral 1 denotes the location of a moisture sensor, of the present invention, on a rotating pelletizing disc of the construction described in my prior U.S. Pat. No. 3,883,281 issued May 13, 1975.

The infra-red moisture gage comprises a measuring head 1 including a lead sulphide detector 2 connected by a signal cable 3 to electronics 2. Now referring to FIG. 1a;

The measuring head 1 has a common light bulb in light source 4 that produces near-infra-red light which is reflected off the process material in varying relative strengths, depending on the amount of surface moisture in the product. This reflected light is "sensed" by the detector in the measurement head 1. The detector optically filters the light, creating measure and reference beams. The lead sulfide detector processes the signal and the digital electronics 2 produce an output equivalent to the product moisture. The standard airsweep minimizes dust and dirt build-up on the sensor windows.

The digital electronics 2 is mounted remotely and connected via two twisted pair signal cables 3, one for the measurement signal and one for a diagnostic signal.

Referring to FIG. 1a, the moisture sensor 1 on a pelletizing disc is a two component unit. It has an infra-red sensor head and digital support electronics. The sensor head contains an infra-red emitter to generate the rays and a collector to gather the reflected rays. The reflected rays vary in relative strength depending on the amount of surface moisture on the rolling pellets. The collector optically filters the light, creating measure and reference beams. The digital support electronics converts the raw data into a 4-2 ma. signal for the programmable controller.

The programmable controller is a microprocessor. This microprocessor is a single-loop process controller capable of measuring, displaying and controlling the pellet surface moisture between very narrow limits. The width of the control band can be adjusted as can the speed of changes and the cycle time of the readings.

The spray nozzles are located, as required, to spray onto the material rolling on the face of the pelletizing disc.

Figure 2A:
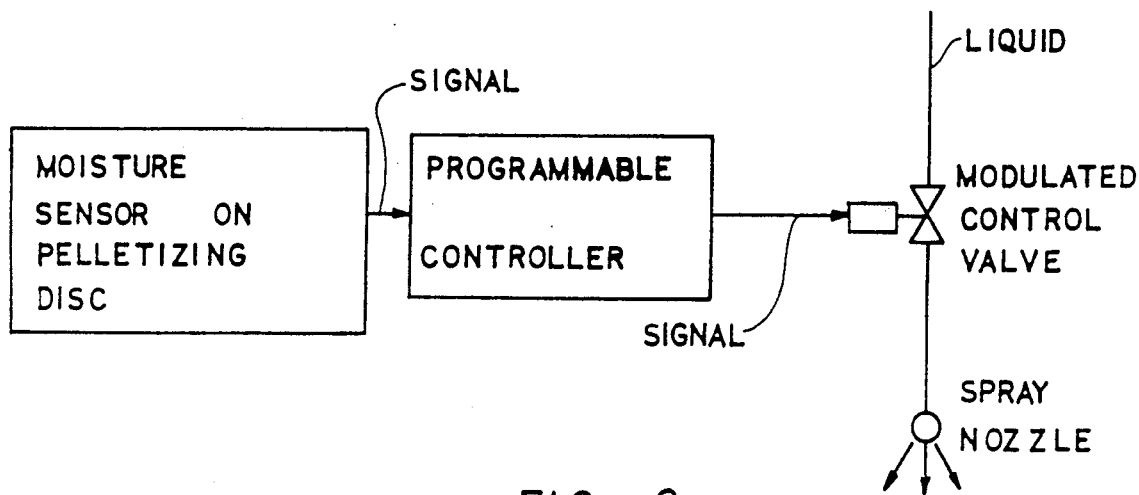
FIG. 2a and 2b are schematic diagrams showing a control system embodying the present invention for modulating a control valve to provide a spray (FIG. 2a) or mixer (FIG. 2b) to provide a consistent product.
Figure 2B:
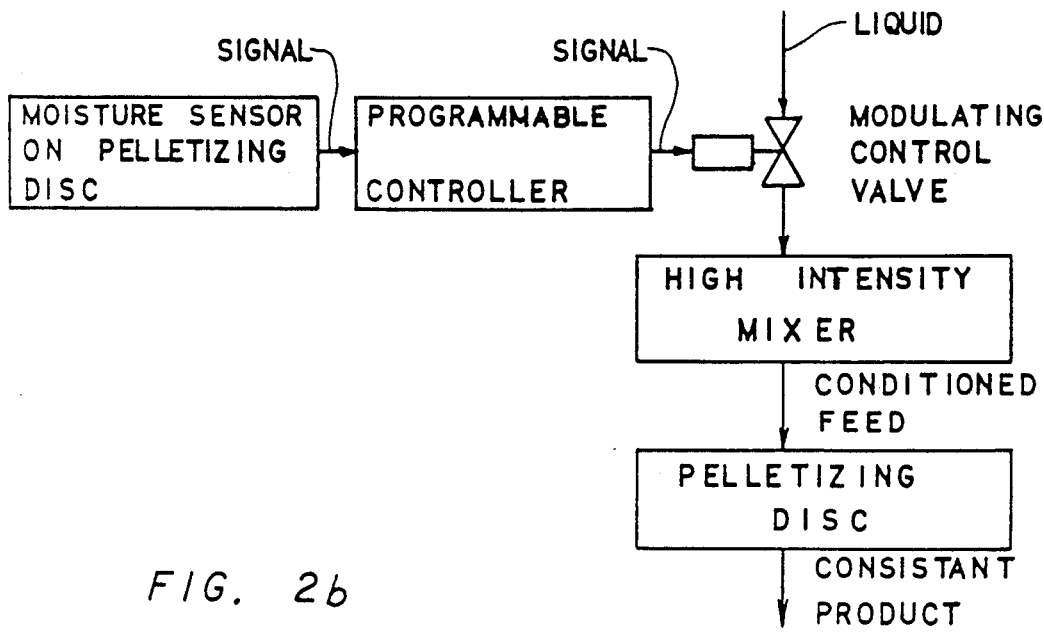

More specifically, FIG. 2b shows a control system for adding liquid to a high intensity mixer based on maintaining constant surface moisture on the pelletizing disc.

This system is the same as shown in FIG. 2a except that the liquid from the modulated control valve discharges directly into a high intensity mixer where each particle is coated with the liquid. The liquid can be water or it can be a slurry containing a uniform amount of solids. The conditioned material is discharged directly onto a pelletizing disc where pellets are formed. This system can operate with all the moisture being added in the mixer or a constant amount of water can be sprayed on the pelletizing disc in addition to a variable amount being added to the mixer.

Figure 3:
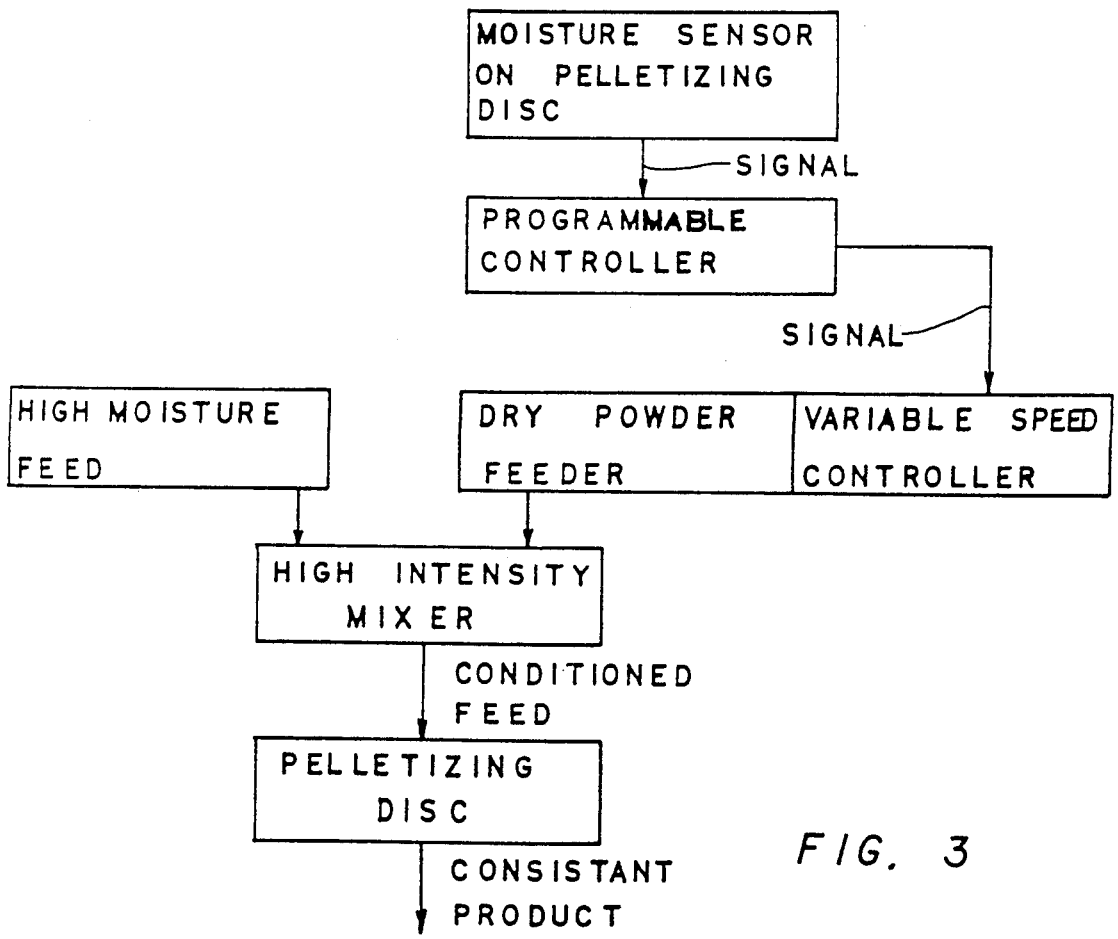
FIG. 3 shows, schematically, a control system for blending high moisture feed with dry powder to produce a consistent product from the pelletizing disc.

More specifically, FIG. 3 shows a control system for blending high moisture feed with dry powder to produce constant product from the pelletizing disc.

This system has the same moisture sensor on the pelletizing disc and the same programmable controller as FIG. 2a and 2b, however, the 4-20 ma. signal from the programmable controller is utilized to control the screw speed on a screw feeder which is driven by a 3 HP electric motor. The speed of the motor is controlled by a pulse width modulated electronic variable frequency drive. The drive is to produce a 20 cycle output with a 4 ma. signal from the programmable controller and 60 cycle output with a 20 ma. signal.

The dry powder is discharged into a high intensity mixer to which a feed stream of metal hydroxide filter cake containing 80% moisture is being added. The conditioned feed from the mixer contains a uniform 40% moisture which is required for pelletizing.

The moisture sensor on the pelletizing disc maintains this moisture even if the filter cake moisture or quantity varies.

At times, I have found it advantageous to utilize a high intensity mixer to condition very fine material before placing the material onto the pelletizing disc. I have also found, unexpectedly, that as shown in FIGS. 2a and 2b the output signal from a programmable controller (computer) can be utilized to control a control valve to vary the amount of liquid added to this mixer and, in this manner, produce more uniform pellets from the pelletizing disc. The high intensity mixer functions best if of the type shown in my prior patent however, it can be any type of pin or plow mixer.

As shown in FIG. 3, a third method of utilizing the signal involves utilizing a high intensity mixer in conjunction with a pelletizing disc to blend a "high" moisture bearing material with a "dry" material to produce a blend which is at the proper moisture for pelletizing. In this situation, it is best to try to provide a constant flow of the "high" moisture material and vary the addition of "dry" powder to produce consistent pellets discharging from the pelletizing disc. The signal from the programmable controller (computer) is utilized to control the speed of a feeder which is adding the proportionate "dry" material to the high intensity mixer.

While I have illustrated and described several embodiments of my invention, it will be understood that these are by way of illustration only and that various changes and modifications are contemplated in my invention within the scope of the following claims:

I claim:

1. An apparatus for spraying water on granular material in a tilted rotating cylindrical pelletizing pan and for compressing the mixture into pellets, comprising a moisture sensor located above said pan over the top of finished rolling pellets responsive to moisture changes on the surfaces of said finished rolling pellets which are ready to exit said pan, a programmable computer controller responsive to moisture changes and a control valve modulated by said programmable computer controller of providing a constant moisture content on the surface of forming pellets, said moisture sensor comprising an infra red unit having an infra red emitter which emits infra red rays which are reflected from said finished pellets on said pelleting pan, and a collector for collecting the reflected rays, the amount of reflected rays being a function of the average amount of surface moisture on said finished pellets, and a high intensity mixer for mixing dry powder in varying amounts with high moisture material in response to said programmable controller to produce a blend which is at a proper moisture for pelletizing and thereby produce consistent pellets discharging from said rotating cylindrical pelletizing pan.

* * * * *